(12) United States Patent
Lee

(10) Patent No.: US 7,392,615 B2
(45) Date of Patent: Jul. 1, 2008

(54) PROCESS TO PRODUCE A COMMERCIAL SOIL ADDITIVE BY EXTRACTING WASTE HEAT, EXHAUST GAS, AND OTHER COMBUSTION BY-PRODUCTS FROM A COAL POWER GENERATOR

(76) Inventor: L. Courtland Lee, 6106 Hillmeade Rd., Glenn Dale, MD (US) 20769

( * ) Notice: Subject to any disclaimer, the term of this patent is extended or adjusted under 35 U.S.C. 154(b) by 1045 days.

(21) Appl. No.: 10/740,515

(22) Filed: Dec. 22, 2003

(65) Prior Publication Data

US 2004/0129045 A1    Jul. 8, 2004

Related U.S. Application Data

(60) Provisional application No. 60/435,871, filed on Dec. 24, 2002.

(51) Int. Cl.
*C09K 17/14*    (2006.01)
(52) U.S. Cl. .................... 47/58.1 SC; 71/11; 71/23; 71/24; 71/903
(58) Field of Classification Search .............. 71/11, 71/23, 24, 903; 47/58.1 SC
See application file for complete search history.

(56) References Cited

U.S. PATENT DOCUMENTS 5,885,319 A * 3/1999 Burton ........................ 71/9

OTHER PUBLICATIONS

R. B. Clark et al, "Mineral Acquisition by Maize Grown in Acidic Soil Amended with Coal Combustion Products", Commun. Soil Sci. Plant Anal., 32 (11&12), 1861-1884 (2001), (no month).*
Prashanta K. Sarangi et al, Soil biochemical activity and growth rersponse of rice Oryza sativa in flyash amended soil, Bioresource Technology 76 (2001) 199-205, (no month).*

* cited by examiner

*Primary Examiner*—Wayne Langel
(74) *Attorney, Agent, or Firm*—Jones, Tullar & Cooper, P.C.

(57) ABSTRACT

Exhaust gas 2 from a coal power generator 4 may be used to provide a commercial soil additive. The exhaust gas 2 is fed to a growing cell 14 containing bio-mass material. After the bio-mass material matures, the bio-mass material is harvested to produce the commercial soil additive, which is preferably treated to produce mulch 18 and compost 20.

18 Claims, 5 Drawing Sheets

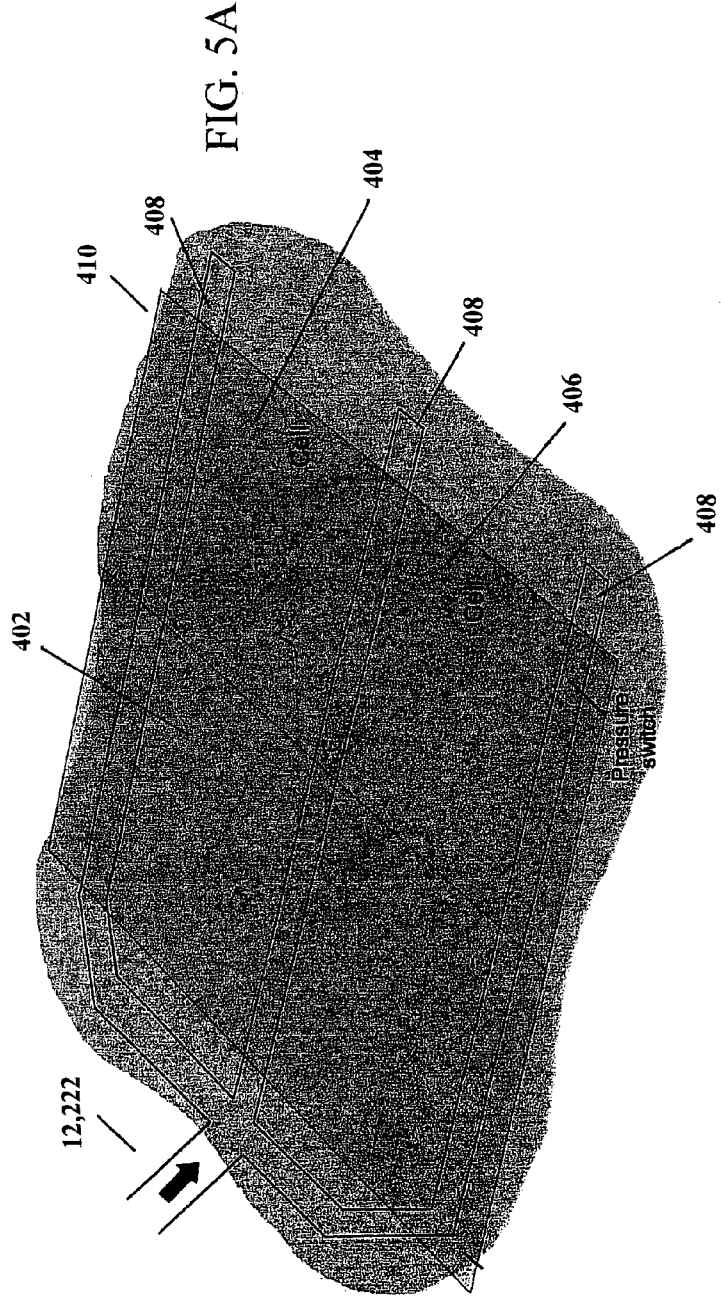
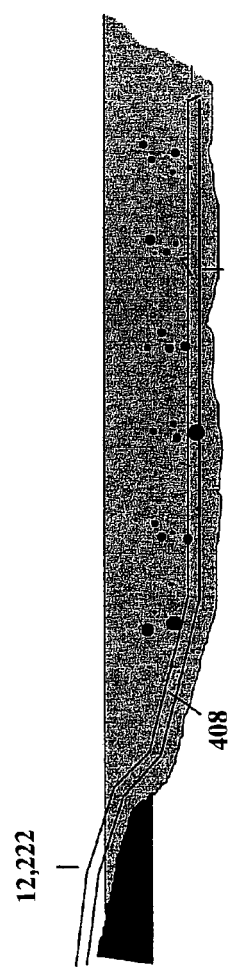

PROCESS TO PRODUCE A COMMERCIAL SOIL ADDITIVE BY EXTRACTING WASTE HEAT, EXHAUST GAS, AND OTHER COMBUSTION BY-PRODUCTS FROM A COAL POWER GENERATOR

CROSS-REFERENCE TO RELATED APPLICATIONS

This application claims the benefit, under 35 U.S.C. 119 (e), of U.S. Provisional Application No. 60/435,871 filed Dec. 24, 2002, the contents of which are incorporated herein by reference.

BACKGROUND OF THE INVENTION

1. Field of the Invention

The present invention related to a process for producing a commercial soil additive from exhaust gas generated from a coal power generator.

2. Description of Related Art

Over a million new homes per year have been developed from American farm land in recent decades with little being done to improve the soil after development. Soil additives may be used to improve soil quality in these areas as well as broader agriculture applications. Currently, peat moss is used as a soil additive to lower pH. However, it is mostly imported from Canada and is very expensive for agricultural use. A greater supply of soil additives, particularly in a wider pH range, could be used to replenish depleted soil if it could be produced at a lower cost. Since the cost would be low, the soil additive could be supplied to larger areas of land without incurring a large cost to the consumer.

America is the "Saudi Arabia" of coal. Coal is America's greatest fossil fuel geological resource and now produces over half of the nation's electricity. Natural gas currently produces approximately 15% of the nation's electricity. Current and future coal use in power generation is defined by environmental regulations including where power plants are sited, what quality of coal can be mined and burned, and the economics of its use. Overall environmental theories such as global warming have become paramount in directing research and planning in the use of coal as a future fuel. The history of the modern use of coal as an energy stock has been driven by environmental legislation and regulation from Clean Air Act 1, 2, Surface mining Acts and Regulations, and concerns over global warming. Though great strides have been made to reduce sulfur and other emissions from coal fired electrical generators, the basic process remains as a perceived "smokestack" industry which causes enormous political, siting, and public acceptance problems. It would be advantageous to develop a commercial by-product which provides a market for the carbon and other by-products produced from coal power generators. An ideal process would also utilize the water energy generated in coal use. This type of process would greatly expand coal resources.

BRIEF SUMMARY OF THE INVENTION

The present invention takes advantage of the exhaust gas and by-products produced from a coal power generator to produce a large supply of a commercial soil additive, including an additive with a low pH, at a relatively low cost. Generally, the exhaust gas is directed into a growing cell to "grow out" a bio-mass material in a confined space. By adding and controlling various components and taking advantage of waste heat in the exhaust gas, maximum growth of the bio-mass material is achieved. The bio-mass material is harvested to provide the commercial soil additive that is then converted into compost and/or mulch using standard horticultural techniques. This process develops a win-win solution driven by both a needed alternative process for coal fired energy production and a commercially viable by-product soil additive to replenish depleted soil.

In a preferred embodiment, the exhaust gas is first directed to a mixing chamber, whereby the exhaust gas may be mixed with condenser cooling steam, additional water, air, lime and/or fertilizer. One or more mixing chambers can be employed depending on the variety of the commercial soil additive to be produced. As much waste heat as possible is retained at this stage to be extracted and redirected, depending on the outside temperature, for later use in growing the bio-mass material. Upon leaving the mixing chamber, an exhaust product is blown through the growing cell containing the bio-mass material. When growth of the bio-mass material in the growing cell reaches its maturity, the bio-mass material is physically removed to provide the commercial soil additive that is further subjected to mulching and/or composting using known techniques in the industry.

The present process not only burns a wide variety of coal cleanly, but the exhaust gas, including any combustion by-products, from a coal power generator can be inexpensively converted into a commercial soil additive used in mulch and/or compost mixing with other combustion by-products or additives to improve productivity of soil for agriculture or ornamental land use. The present invention eliminates the need for smokestacks for dissipation of exhaust gas from coal power generators resulting in siting advantages and an increase in the competitive advantage of coal for future power use. A commercial soil additive that is adjustable to several pH values is the end result of this process, which will both improve organic matter in soil and reduce carbon dioxide and other pollutants in the atmosphere.

The present invention is very versatile and may be operated in all seasons and in a wide variety of latitudes and climates using most coals. Exhaust gas contains emissions, such as carbon dioxide, nitrogen oxides, and sulfurs, which are converted into a commercial soil additive that is used in mulch and compost. This cleans the air and provides an economic method of recovering the carbon in coal in addition to conserving energy. The present invention adds value to coal resources by converting an existing liability into a saleable product. In general, the process is relatively low cost, improves coals political advantages, and enhances the potential of America's vast domestic coal resources. The commercial soil additive can supply a product that adjusts the pH of soil downward, which is currently difficult to do with available commercial horticultural and agricultural additives. The resulting commercial soil additive is a needed soil augmentation for organic rich mulch and compost that is useful for depleted soil. The commercial soil additive may be used to lower the pH of certain soils making it a premium product for alkaline soils, limestone soils, and desert soils. Using state of the art confined gas detection technologies, the present invention monitors control venting of cleaned stack gas. The process can automatically recycle the exhaust product in the growing cells until the emission levels in the exhaust product are acceptable to vent. Production of soil additives near a power plant can take advantage of back hauling in empty coal cars. Public acceptance of no smoke stack technology may allow small power plant construction near a city or suburb, close to the market for a commercial soil additive.

BRIEF DESCRIPTION OF THE SEVERAL VIEWS OF THE DRAWING(S)

The features and advantages of the present invention will become apparent from the following detailed description of a preferred embodiment thereof, taken in conjunction with the accompanying drawings, in which:

FIG. 5A is a top view of a preferred deep water growing cell; and

FIG. 5B is a side view of a preferred deep water growing cell.

DETAILED DESCRIPTION OF THE INVENTION

Figure 1:
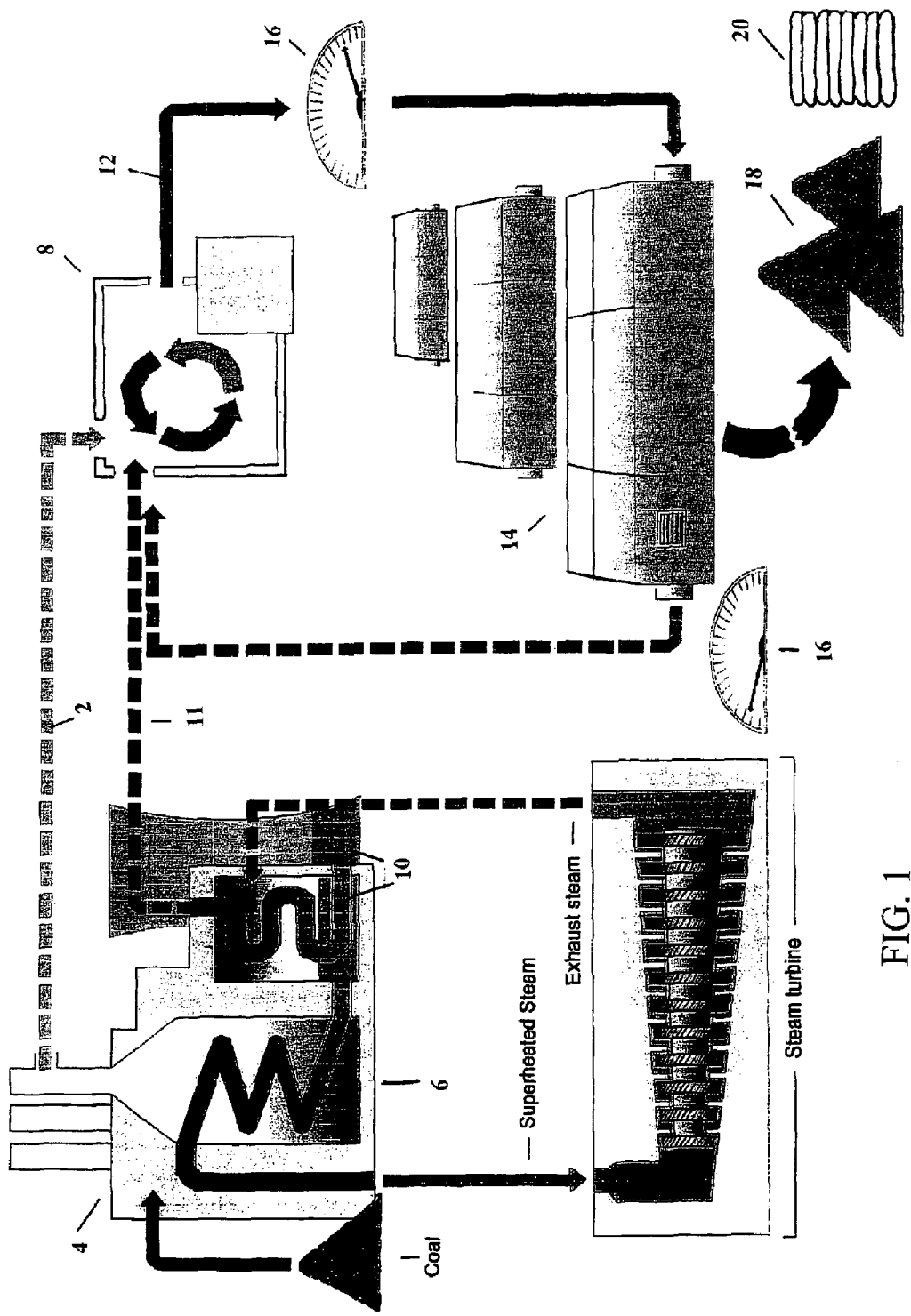
FIG. 1 is a flow-chart of a preferred process for producing a commercial soil additive from exhaust gas of a coal power generator.

FIG. 1 shows a preferred flow-chart for producing a commercial soil additive from an exhaust gas 2, which may also contain combustion by-products, produced from a coal power generator 4. Exhaust gas 2 is preferably captured from a power plant combustion chamber 6 and blown to a mixing chamber 8 retaining both waste heat and the exhaust gas 2. It should be understood that a mixing chamber 8 may not always be required, especially in lower latitude regions of the world. Condenser cooling steam or water 10, and added irrigation water as needed, may also be fed into the mixing chamber 8 via cooling line 11. One or more mixing chambers 8 can be employed depending on the variety of the commercial soil additive to be produced. As much waste heat as possible is retained at this stage for extraction and redirection, depending on the outside temperature, for later use in the process. Upon leaving the mixing chamber 8 an exhaust product 12 is blown through a growing cell 14 containing a bio-mass material. Multiple interconnected growing cells 14 are preferably controlled by currently available space gas detection units 16, with multiple detection sensors for each growing cell 14, sampling sulfur dioxide, nitrogen oxides, carbon dioxide, and other regulated gases. Data from the space gas detection units 16 is preferably fed into a computer with preset standards. Exhaust product 12 is automatically moved between growing cells 14 until the exhaust product 12 has been depleted of the measured gases to the preset standards. In a preferred embodiment, the exhaust product 12 may be recycled to the mixing chamber 8 until depletion occurs. The growing cells 14 are individually vented to the atmosphere and filled with new exhaust product when threshold air quality standards are met. When growth of the bio-mass material in the growing cells 14 reaches maturity or maximum growth, the bio-mass material is physically removed to provide the commercial soil additive and preferably converted to mulch 18 and/or compost 20 using well known commercial techniques.

Figure 2:
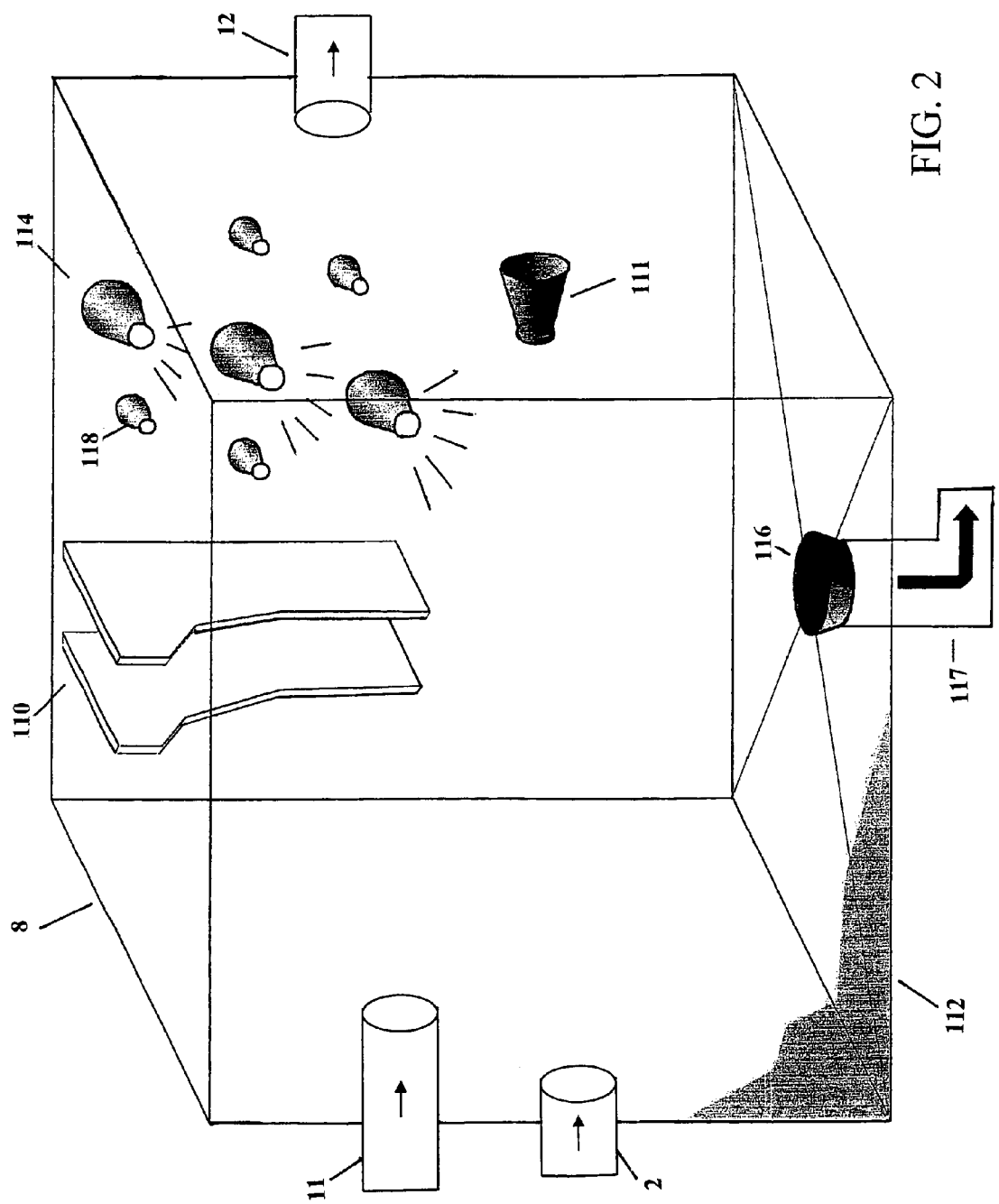
FIG. 2 is a schematic of a first preferred mixing chamber.

FIG. 2 shows a schematic of a first preferred mixing chamber 8. The mixing chamber 8 preferably contains a plurality of baffles 110 to increase turbulence and mixing of the exhaust gas 2 with water mist, outside air, lime and/or fertilizers, as needed to maintain monitoring quality. Lime, fertilizer, or other ingredients needed to achieve quality may be added through additive feed line 111. It is preferred that the mixing chamber 8 be constructed of a corrosive resistant plastic lined box 112 with dimensions proportional to the amount of input from the exhaust gas 2. Compressing fans or compressors are preferably linked with pressure switches within the mixing chamber 8 to maintain throughput at desired levels. When afternoon temperatures are high, for example, mid-afternoon on a hot summer day, heat can be removed from the mixing chamber 8 by using of a series of spray nozzles 114 that provide cool water, preferably from an irrigation pond. A drainage sump 116 collects effluent 117 from the mixing chamber 8, including heated water, absorbed exhaust gases, precipitate, injected fluids, and waste heat. In a preferred embodiment, the drainage sump 116 pumps the effluent 117 to an irrigation pond for cooling in the summer. Whereas in the winter, the effluent 117 collected in the drainage sump 116 may be directed to the growing cell 14 containing the bio-mass material. For example, the effluent 117 may be pumped into a series of horticulture heating tubes under a series of growing cells 14 to supply bottom heat before returning to an irrigation pond. Additionally, small misting nozzles 118 may be preferably used to maintain the desired humidity and temperature within the mixing chamber 8.

Figure 3:
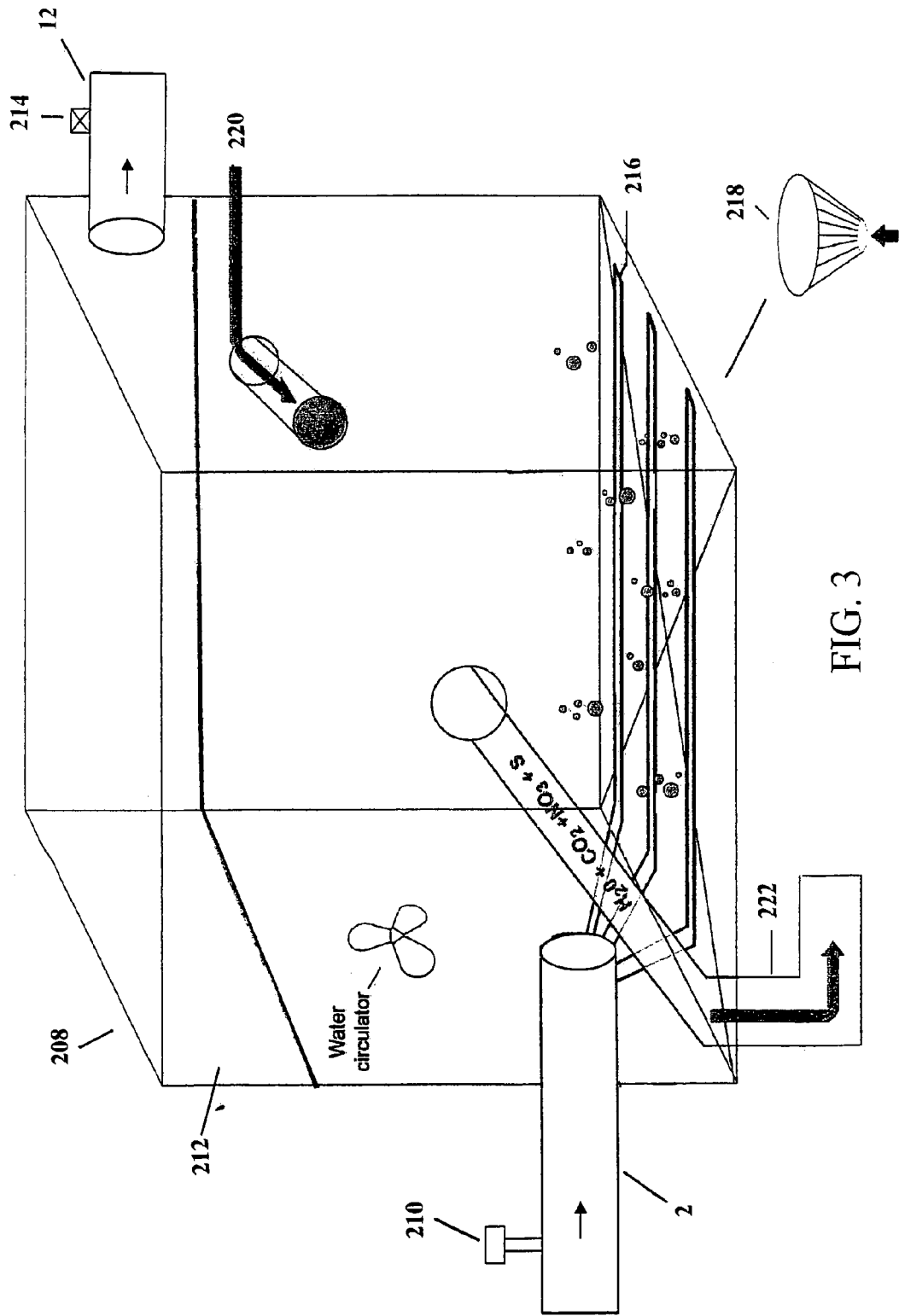
FIG. 3 is a schematic of a second preferred pressurized water filled mixing chamber.

FIG. 3 shows a schematic of a second preferred pressurized water filled mixing chamber 208 used to increase absorption of carbon dioxide and other gases into an aqueous medium for pumping greater distances, such as to a more distant irrigation pond or growing cell 14. This pressurized water filled mixing chamber 208 may replace the basic process mixing chamber 8 but will require more substantial construction, such as reinforced concrete, due to the increased pressure. In both cases, the mixing chamber 8, 208 is proportional to the volume of exhaust gas 2 and preferably lined with acid resistant plastic, such as is used in pond liners, or a comparable material. Pressure switches 210 are set to keep the pressure of the exhaust gas 2 higher than the water pressure. An air space 212 is retained at the top of the pressurized water filled mixing chamber 208 to move the exhaust product 12 to a growing cell 14 when gases in the exhaust product 12 meet predetermined thresholds as monitored by a gas sensor 214. A compressor is recommended for movement of the exhaust gas 2 through a series of bubbling devices 216 which run the length of the pressurized water filled mixing chamber 208. The bubbling devices 216 may include a plurality of conical, slotted spreading devices 218 to increase bubbling surface area. The individual bubbling devices 216 preferably contain back flow preventers and are made from corrosion resistant pipe, such as heavy duty PVC. The diameter of the pipe is determined by the desired volume. Insulated heat duct pipes may be used to save waste heat where possible, and is placed as near to the condenser as possible. A pump may also be required to move incoming water 220, preferably from an irrigation pond, through the pressurized water filled mixing chamber 208. A booster pump may also be required to move outgoing nutrient rich water 222 to the appropriate growing cell 14. In this embodiment, direct irrigation of the bio-mass material in the growing cell 14 is possible. Alternatively, the nutrient rich water 222 may be directed to growing cells 14 formed from a preferred series of basic horticulture hoop houses. The nutrient rich water 222 could be pumped to a growing cell pond 304, as discussed in Example 2, or where appropriate to deep water growing cells 402, as discussed in Example 3. This preferred embodiment is designed for a higher throughput and can handle a greater volume of exhaust gas 2. Pyrite, an iron sulfide, inclusions in the coal can be washed out of the coal prior to burning under current techniques. This material can be crushed and pumped to a lined pond providing a ponded pyritic soup. Acid can be added to lower the pH or lime can be added to raise it, and provide a source of material to be blended with certain grades of soil additive. The organic sulfur in the coal can be absorbed in the growing cell.

The growing cell 14 may be designed in any appropriate manner which directs the exhaust gas 2 from the coal power generator 4 to the bio-mass material. The following Examples are preferred embodiments, however, the present invention is not limited to these Examples. One of skill in the art would be able to envision similar growing cells 14 that would produce the desired commercial soil additive without departing from the scope of the present invention.

EXAMPLE 1

Growing Cells 14

FIG. 1 shows a first preferred embodiment whereby the exhaust product 12, upon leaving the mixing chamber 8, is blown through a series of growing cells 14, preferably horticulture growing frames, tailored to available growing space, climate and other factors. In a preferred embodiment, a 50'× 300' horticulture hoop house with bottom heating cables, supplied from the waste heat of the mixing chamber 8, may be used. It is also preferred that the growing cells 14 have access for plant farming and harvesting. For example, in northern latitudes, apex hoops for snow loads would be recommended. Additionally, it is preferred that UV treated plastic be used because of its economical year round use. A base growing soil, preferably at least one foot above the heating cables, would be a recommended thickness for maximum growth. The number of frames is proportional to the amount of exhaust gas 12, allowing extra frames for removal of the bio-mass material, cleaning and repair.

The bio-mass material can be adjusted to the quality of the coal. Coal itself, once plant material, contains nitrates, K-clays, phosphate, sulfur and other elements found in many fertilizers. Sulfur is required by most plants for healthy growth and is an element in many fertilizers. Some plants have much higher ability to incorporate sulfur than others and additives can change the tolerance. Proper concentrations of these elements will be the key to proper growth of select bio-mass material.

Multiple interconnected growing cells 14 are controlled by currently available confined space gas detection units 16, with multiple detection sensors for each unit, sampling sulfur dioxide, nitrogen oxides, carbon dioxide, and other regulated gases. The data is preferably fed into a computer with preset standards and automatically moves exhaust product 12 between growing cells 14 until the exhaust product 12 has been depleted of the measured gases to preset standards. The growing cells 14 are then vented to the atmosphere and filled with new exhaust product 12. Since rapidly growing bio-mass material will deplete the confined atmosphere more quickly than a recently harvested growing cell 14, an excess of growing cells 14 is preferred for down time for harvest, repair and cleaning. Existing commercial horticulture houses run at four times ambient $CO_2$ levels, but, in this case, much higher concentrations should be achieved. The bio-mass material selected for growing will need to be adjusted for maximum absorption of carbon dioxide, sulfur oxides, nitrogen oxides and other exhaust gases. However, upon harvest, blending and mixing can be used to economically weigh trade offs with the final commercial soil additive.

Growing in the horticulture frames may continue year round, even in higher latitudes. Use of artificial light in the confined space in the horticulture frame may achieve growth for as much of the 24 hour day as possible. These artificial lights can be halogen, fluorescent grow lights, or other depending on cost efficiency for the selected bio-mass material. The horticulture frames themselves should be designed to take the appropriate snow load. They preferably contain an overhead irrigation system drawing on an irrigation pond which is preferably connected to the mixing chamber 8. An overhead lighting system, size and flooring structure should allow for quick removal of mature bio-mass material to a mulch and composting area. UV treated, tear resistant covering should be a minimum for covering the frames.

There are a number of methods to regulate the temperature of an irrigation pond, including interconnected ponds and air spraying. In all seasons irrigation water would be used to irrigate directly in the horticulture frames by standard spray irrigation. The runoff would be returned to the irrigation pond forming a closed system. Once fluids are collected in a lined irrigation pond, water from near the top of the pond would be drawn off to irrigate horticulture houses. Periodic testing and treating of pond water may be required as well as periodic recovery of pond sludge which can be stockpiled or mixed with the compost product after testing and treating to assure quality control. Some irrigation water might be acceptable to be used for ordinary agriculture if no further treating is required. Air jets or corrosion resistant fans may augment mixing.

There are a number of plant species that can be used as the bio-mass material which are selected for rapid growth, sulfur adsorption, and compatibility with the environment of the present process. Diverse species offer some advantages. High humidity, high $CO_2$ coal forming environments might give some important clues to plant species selection. Plant species that may be used as bio-mass material include, but are not limited to, fast growing plants such as sphagnum, sour grasses, sulfur tolerant trees or plants, gingko, algae, moss, and seaweed. However, other plant species may perform at a desired level as well.

When confined space gas detection units 16 within individual horticulture frames show appropriate conditions of $CO_2$, sulfur dioxide, and other gases, the intake to the frame is closed. The horticulture frame is then automatically and quickly vented. When the venting is complete the intake is reopened. A series of frames may be controlled simultaneously to allow cleaning of the exhaust product 12 while continuous feed is maintained. Until the appropriate quality is reached, the exhaust gas 12 is recycled to the mixing chamber 8. The number of horticulture frames is expanded to accommodate the amount of exhaust gas 2 from the coal power generator 4 with excess capacity to allow for removal of mature bio-mass material, maintenance, repair or other problems.

When growth in a frame reaches its maturity, the bio-mass material is physically removed and composted using well known commercial compost techniques. By mixing material from the ponded pyritic soup and fly ash, or horticultural lime, with the commercial soil additive, a wide range of pH is provided to the finished compost product. A new cycle is started within the frame using a base growing soil mixture which may contain ash, compost, sewage sludge where quantity and quality are available, and whatever other organic material is available. The frame is seeded and/or growing seedlings are planted. The compost is tested and shipped using coal railcars where possible.

EXAMPLE 2

Growing Cell Pond

Figure 4:
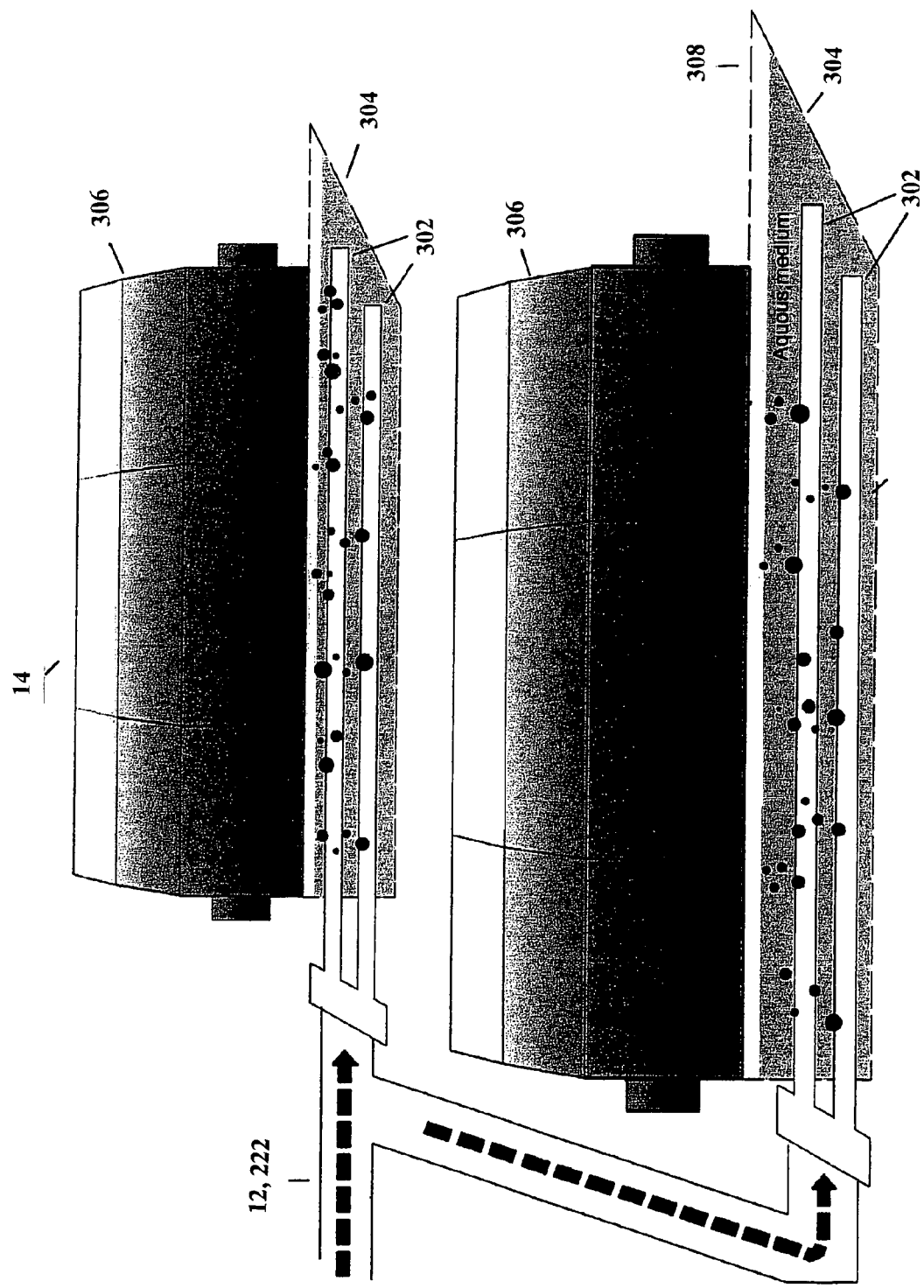
FIG. 4 is a preferred embodiment of a growing cell pond.

As shown in FIG. 4, instead of blowing the exhaust product 12 into the air space of the growing cells 14, the exhaust product 12 is pumped into bubbling devices 302, preferably bubbling tubes, located within a growing cell pond 304, such as a closed growing pond. The bubbling devices 302 are preferably submerged about 6 feet below the water surface of the growing cell pond 304. The growing cell pond 304 may be located within a preferred commercial hoop structure 306. A pressure switch controls the pumping of the exhaust product 12 to maintain higher pressure than the bottom liquid pressure and bubbles the exhaust product 12 through water which is monitored for temperature, pH, and nutrient content by similar space gas detection units as previously mentioned. Fertilizer, lime, or other controlling material can be added directly to the water. A propeller or water jet is installed to retain circulation. Waste heat from the mixing chamber 8 can directly warm the water. Circulating water, preferably from an irrigation pond, as well as misting, can cool the growing cell pond 304 in the summer. The growing cell pond 304 can be drained to harvest the organic material. The bubbling devices 302 can be made of plastic PVC or otherwise, but need to be removed and replaced for maintenance and cleaning.

Sphagnum, algae, reeds, water hyacinth or other rapidly growing bio-mass material may be produced and harvested with mechanical scoops or rakes. However, other fast growing plants may also be used as the bio-mass material. Removal of the bubbling devices 302 would facilitate harvesting and repair. A ramp 308 simplifies access for mechanized equipment to harvest if the growing cell pond 304 is drained. These growing cell ponds 304 are preferably lined with rubber, plastic or concrete, whichever is most economical. Suction dredges may also be used for harvest of the bio-mass material.

Alternatively, the growing cell pond 304 may be supplied with nutrient rich water 222 from a pressurized water filled mixing chamber 208 as previously discussed. FIG. 3 illustrates the preferred pressurized water filled mixing chamber 208.

EXAMPLE 3

Deep Water Growing Cells

FIG. 5A and FIG. 5B show a preferred embodiment dealing with either pumping exhaust product 12 from a mixing chamber 8 or pumping nutrient rich water 222 from a pressurized water filled mixing chamber 208 directly into deep water growing cells 402, 404, 406 preferably up to 10 meters or more. When exhaust product 12 is pumped to the deep water growing cells 402, 404, 406 the exhaust product 12 is provided using bubbling devices 408. The dimensions of the deep water growing cell 402, 404, 406 depends on the area availability and the throughput of exhaust product 12. The deep water growing cells 402, 404, 406 may be open growing ponds, fresh water, or salt water growing cell. The deep water growing cells 402, 404, 406 can be separated by earthen dikes, wire nets with tyvec type fabric separation or even open net (nylon or poly) that encourages bio-mass material growth while limiting mixing between deep water growing cells 402, 404, 406. Bio-mass material harvesting would be done with barge and hydraulic raking devices, or suction dredge directly to drying beds for composting. This preferred embodiment along with the pressurized water filled mixing chamber 208 would handle significant exhaust gas 2 from operating coal power generators 4, collected after precipitation of ash. This preferred embodiment is dependent on the availability of land, basic horticulture frames, or pond or sea water availability.

As with the basic growing cells 14, multiple deep water growing cells 402, 404, 406 may be need to adequately grow out the exhaust product 12. A series of deep water growing cells 402, 404, 406 can be used whereby the waste from a first deep water growing cell 402 is collected and pumped into a bubbling unit of a second deep water growing cell 404. The process is contained by floats supporting UV resistant horticulture plastic 410. The gas in the exhaust product 12 is collected in an air space between the water surface and the plastic 410 and is monitored by pre-set confined space gas detection units connected to collection fans and pumps, which moves the exhaust product 12 to the next deep water growing cell until vented. Extra deep water growing cells in the series are needed for routing around those under maintenance or harvest. Constant temperature is regulated by waste heat or adding deeper cool water, but due to the volume of water should be easily managed.

Although the present invention has been disclosed in terms of a preferred embodiment, it will be understood that numerous additional modifications and variations could be made thereto without departing from the scope of the invention as defined by the following claims:

What is claimed is:

1. A process for producing a commercial soil additive comprising,
    a) providing an exhaust gas from a coal power generator,
    b) providing a growing cell containing bio-mass material;
    c) feeding said exhaust gas to said growing cell to promote the growth of the bio-mass material, and
    d) harvesting said bio-mass material to form said commercial soil additive.

2. The process of claim 1, wherein said exhaust gas is carbon dioxide, nitrogen oxides, or sulfur dioxide.

3. The process of claim 1, wherein said bio-mass material is selected from a group of fast growing plants consisting of sphagnum, sour grasses, sulfur tolerant trees or plants, gingko, algae, moss, reeds, water hyacinth, and seaweed.

4. The process of claim 1, further comprising directing said exhaust gas to a mixing chamber prior to step b).

5. The process of claim 4, further comprising mixing said exhaust gas in said mixing chamber with steam, water, air, lime or fertilizer.

6. The process of claim 4, further comprising recycling said exhaust gas in said growing cell to said mixing chamber.

7. The process of claim 1, further comprising converting said commercial soil additive to mulch or compost.

8. The process of claim 1, further comprising monitoring said exhaust gas in said growing cell using confined space gas detection units.

9. The process of claim 1, wherein said growing cell is a base growing soil.

10. The process of claim 1, wherein said growing cell is a closed growing pond, an open growing pond, a fresh water growing cell, or a salt water growing cell.

11. The process of claim 10, wherein said exhaust gas is fed to said growing cell through a series of bubbling devices.

12. A process for producing a commercial soil additive comprising,
    a) providing an exhaust gas from a coal power generator,
    b) providing a growing cell containing bio-mass material;
    c) feeding said exhaust gas to a pressurized water filled mixing chamber to produce a supply of nutrient rich water;
    d) directing said supply of nutrient rich water to said growing cell to promote the growth of the bio-mass material, and e) harvesting said bio-mass material to form said commercial soil additive.

13. The process of claim 12, wherein said exhaust gas is carbon dioxide, nitrogen oxides, or sulfur dioxide.

14. The process of claim 12, wherein said bio-mass material is selected from a group of fast growing plants consisting of sphagnum, sour grasses, sulfur tolerant trees or plants, gingko, algae, moss, reeds, water hyacinth, and seaweed.

15. The process of claim 12, wherein said exhaust gas is fed to said pressurized water filled mixing chamber through a series of bubbling devices.

16. The process of claim 12, further comprising converting said commercial soil additive to mulch or compost.

17. The process of claim 12, further comprising monitoring said exhaust gas in said growing cell using space gas detection units.

18. The process of claim 12, wherein said growing cell is a base growing soil, a closed growing pond, an open growing pond, a fresh water growing cell, or a salt water growing cell.

* * * * *